May 14, 1957

E. W. COLE 2,792,065

TRACTOR WHEEL POWER TAKE-OFF FOR DRIVING
HITCH SUPPORTED IMPLEMENTS

Filed Feb. 23, 1954

INVENTOR:
ELISHA W. COLE.

BY *Eaton & Bell*

ATTORNEYS.

INVENTOR:
ELISHA W. COLE.

BY Eaton + Bell

ATTORNEYS.

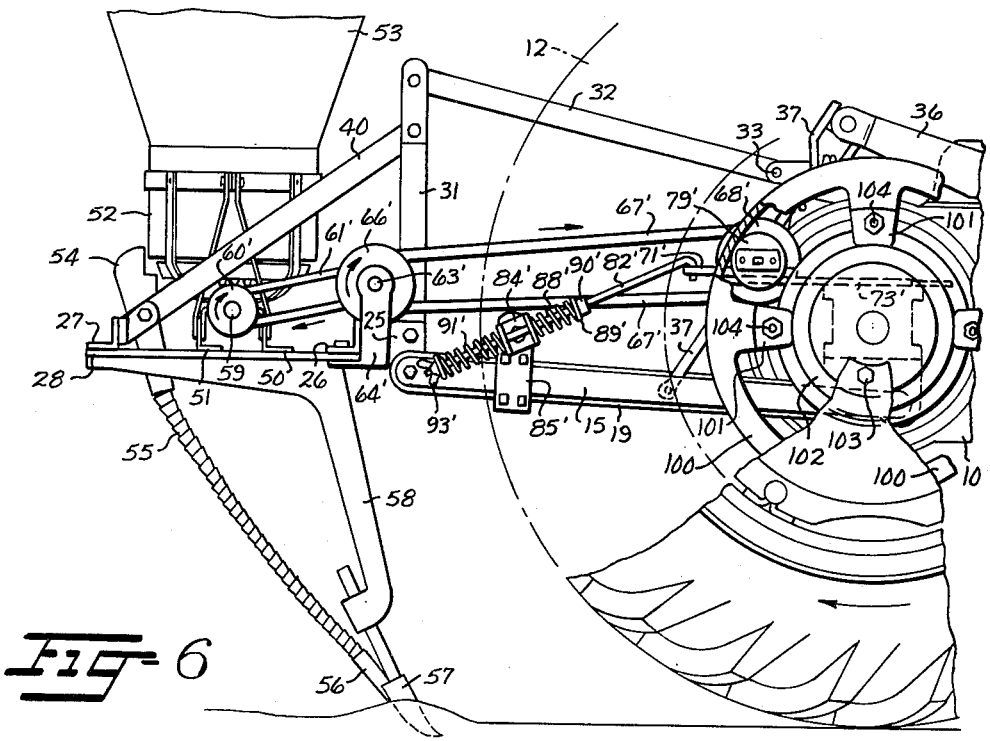
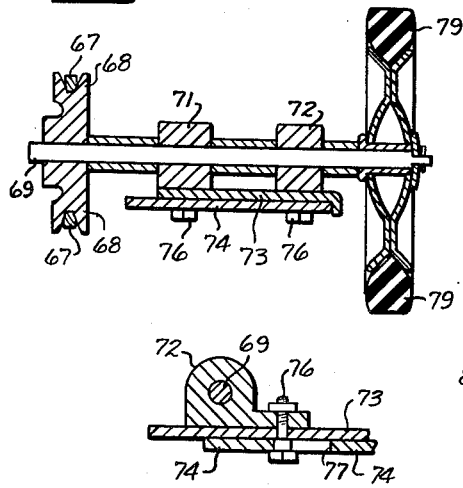
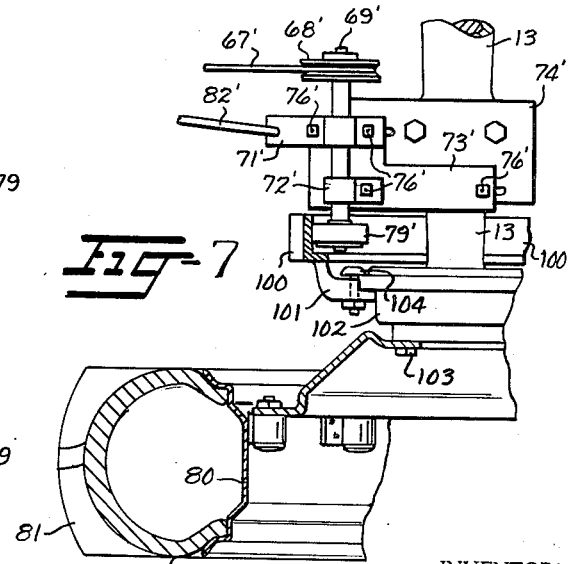

United States Patent Office 2,792,065
Patented May 14, 1957

2,792,065

TRACTOR WHEEL POWER TAKE-OFF FOR DRIVING HITCH SUPPORTED IMPLEMENTS

Elisha W. Cole, Charlotte, N. C.

Application February 23, 1954, Serial No. 411,655

4 Claims. (Cl. 180—53)

This invention relates to driving means for guano distributors, seed planters and the like which are attached to conventional tractors. Heretofore, planters and distributors have usually been driven by a ground wheel in contact with the ground over which the apparatus is traveling. Due to the fact that the ground in planting condition is usually rough, having clods and stones therein and thereon this has been unsatisfactory in that the ground wheel tends to rise upwardly and to become lowered due to the change of contour of the ground and therefore the distributor or planter is not driven at a constant speed, resulting in uneven distribution of the seed or fertilizer which is being distributed.

Also, heretofore, certain planter and distributing mechanisms have been driven from the power take-off mechanism of a tractor to which the framework supporting the planters or distributors have been secured but this has entailed a time consuming job of attaching and detaching the planter driving means from the tractor power take-off mechanism.

It is an object of this invention to provide a drive for planters and distributors which can be quickly attached to or detached from the tractor by employing a friction wheel engageable with a portion of a tractor wheel or an annular member attached to one of the wheels for frictionally driving the friction wheel as the tractor advances and which, when the planting or distributing mechanism is raised to inoperative position, will automatically disconnect the driving mechanism from contact with a wheel of the tractor and thus stop the distribution of seeds or fertilizer.

Some of the objects of the invention having been stated, other objects will appear as the description proceeds when taken in connection with the accompanying drawings, in which—

Figure 5 is a vertical sectional view taken substantially along the line 5—5 in Figure 4;

Figure 6 is a view similar to Figure 3 but showing a modified form of friction drive mechanism;

Figure 7 is a top plan view similar to the lower right-hand portion of Figure 4 but showing the modified form of friction wheel and driving mechanism;

Figure 8 is a longitudinal vertical sectional view taken along the line 8—8 in Figure 4 on an enlarged scale.

Figure 4:
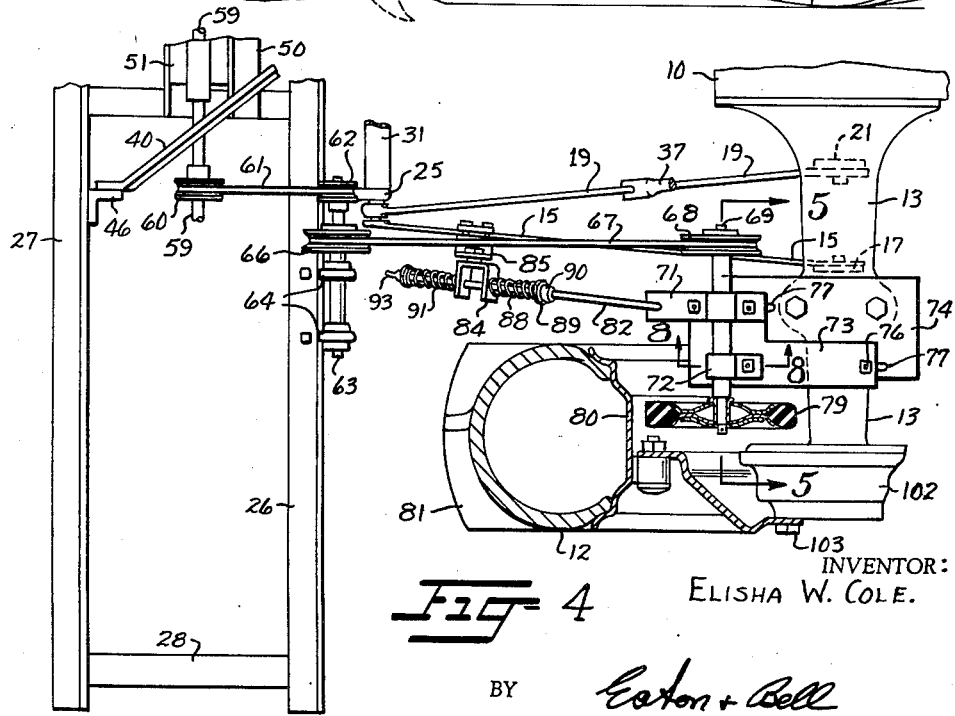
Figure 4 is a top plan view with parts in section of the lower left-hand portion of Figure 2 on an enlarged scale.

Referring more specifically to the drawings the numeral 10 indicates a conventional tractor having front wheels 11 and rear wheels 12 and a rear axle housing 13. The tractor is provided with a lift mechanism including a pair of spaced, lower and outer lift links or pivoted bars 14 and 15 having their front ends pivotally secured to lugs 17 which extend downwardly from the axle housing 13. Spaced lower pivoted links 18 and 19 are also pivotally secured at their front ends to downturned portions 21 on the axle housing, only one of which is shown in Figure 4. The rear ends of these links are secured to angle clips 24 and 25 suitably secured to a front angle bar 26 and there is also a rear angle bar 27. The angle bars 26 and 27 are joined together by suitable bars 28 to form a planter supporting framework. Secured to the angle clips 24 and 25 are upwardly extending and inwardly converging strap iron members 30 and 31 which are pivotally connected to the rear end of an upper link 32 which is pivoted as at 33 to a shock arresting member 34 secured to an upper portion of the rear axle housing 13 and which includes a compression spring 35. The tractor also has hydraulic lift arms 36 to which the upper ends of connecting rods 37 are pivotally connected and which extend downwardly and are pivotally secured to the lift bars 18 and 19.

The upwardly extending strap iron members 30 and 31 have secured thereto strap iron members 40 and 41 which extend rearwardly and away from each other and are secured to angle clips 46 and 47 on the rear angle frame member 27. The framework comprising angle bars 26 and 27 also has suitable longitudinal angle bars 50 and 51 which support a conventional planter or distributor mechanism 52.

The planting or distributing mechanism 52 has a hopper 53 into which the seed or fertilizer is placed for distribution by a distributing mechanism disposed within the lower portion of the planter mechanism 52. This mechanism has a discharge spout 54 for receiving the seed or fertilizer from the distributor and this has connected to the lower end thereof a flexible spout 55 which extends into a tubular portion 56 of a plow or furrow opener 57 which is mounted on a suitable arm 58 extending downwardly from the planter frame.

The planter mechanism has a shaft 59 which drives the internal mechanism of the planting and distributing mechanism and as heretofore stated this shaft had a sprocket wheel mounted thereon provided with a sprocket chain which extended downwardly and was connected to a sprocket wheel associated with a suitable ground wheel which was in contact with the ground over which the mechanism moved.

The mechanism thus far described is conventional and is approximately that of a well known tractor and it is with this or any other suitable conventional mechanism that the invention is adapted to be employed. Instead of having a sprocket wheel on the shaft 59 there is employed a V-pulley 60 having a belt 61 thereon which is mounted on a V-pulley 62 secured on a shaft 63 which is mounted in suitable bearings 64 secured to the front angle bar 26. The shaft 63 has a second V-pulley or rotary wheel 66 secured thereon on which is mounted a V-belt 67 which is also mounted on a driving V-pulley or drive wheel 68 secured on a shaft 69 mounted in suitable bearing blocks 71 and 72 which are secured on a plate 73 which is slidably mounted on a base plate 74 fixed on the axle housing 13.

Suitable shoulder bolts 76 are employed for penetrating slots 77 in the fixed plate 74 (Figures 4 and 8). The plate 73 is adapted to rest on the shoulders of the several bolts 76 which also confine the bearing blocks 71 and 72 into tight engagement with the plate 73 but the shoulder bolts still permit sliding movement of the plate 73 relative to the fixed plate 74. The shaft 69 has a friction wheel 79 fixed thereon which is adapted at times to contact the interior perimeter of a rim 80 of one of the tractor wheels, on each of which a pneumatic casing 81 is usually mounted.

The bearing block 71 has pivotally secured thereto a drive actuating link 82 which extends rearwardly and downwardly and slidably penetrates a U-shaped cuff member 84 which is oscillatably secured to one leg of a Z-shaped support member 85, the other leg of which is fixedly secured to the left link 15. The drive actuating link 82 has a compression spring 88 surrounding the same which engages one leg of the U-shaped cuff member 84 and its other end is confined by a washer 89 held in position by an abutment or collar 90 and on the other side of the U-shaped cuff member 84 is a compression spring 91 which is confined on the shaft 82 by means of a suitable wing nut 93. These springs serve as shock absorbers and, in the event a clod or other foreign matter passes between the rear wheel and the friction wheel, the springs 88, 91 will allow the friction wheel to move away from the rear wheel.

The shaft 59 can extend the length of the frame comprising the angle bars 26 and 27 if desired and an additional planter or planters or distributors can be connected thereto to be driven thereby as is conventional.

Figure 1:
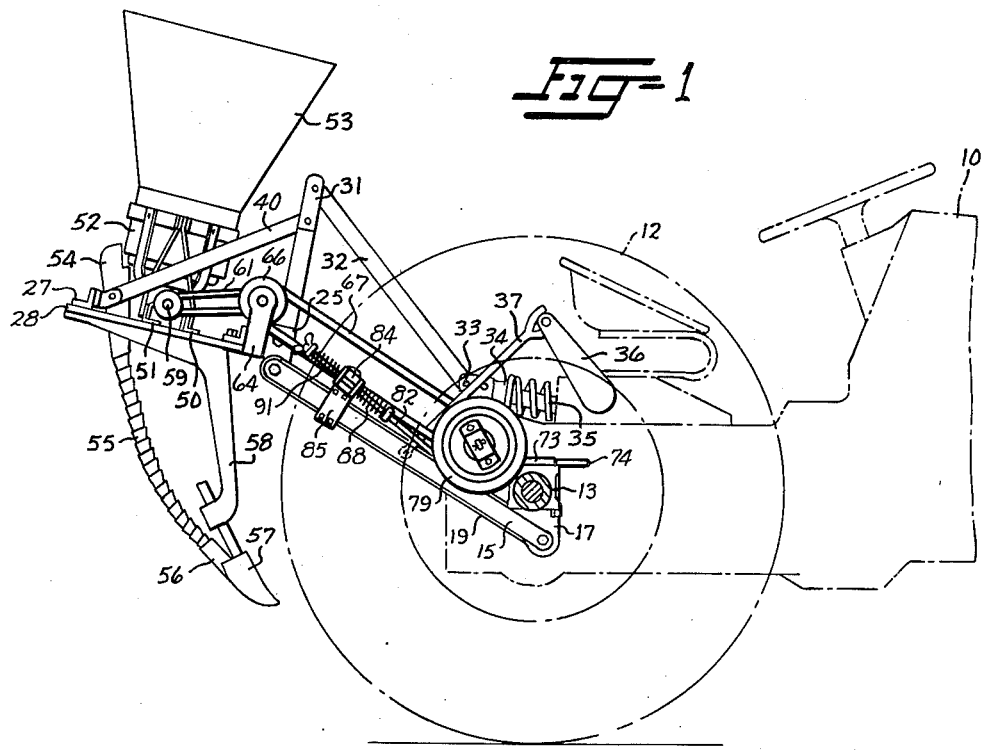
Figure 1 is an elevation showing the planter or distributor raised to inoperative position ready for transport from one location to another.
Figure 2:
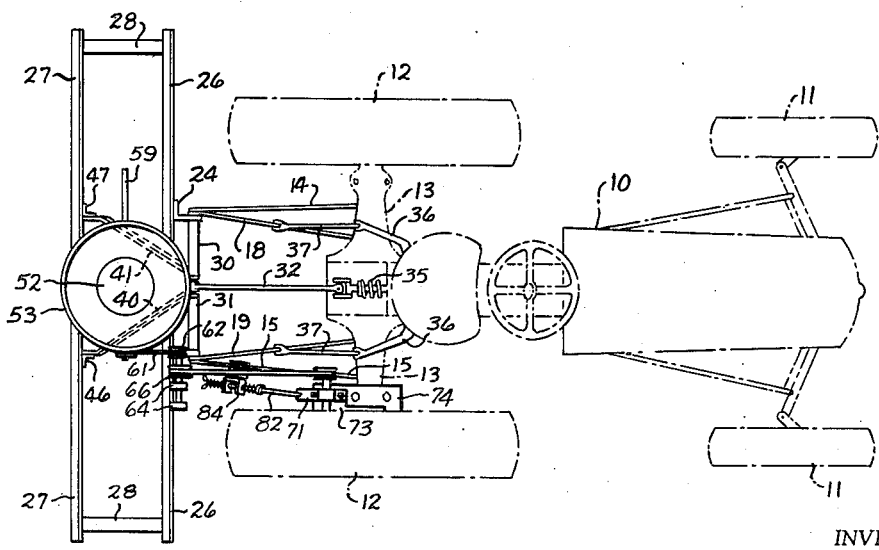
Figure 2 is a top plan view of a conventional tractor and conventional mechanism associated therewith and showing my invention associated therewith.

Now, in the event that the tractor wheels should be further apart than shown in Figure 2, a slightly modified form of the invention would be employed and this is shown in Figures 6 and 7. The reference characters to the conventional parts of the tractor shown in Figures 1 through 4 and the tractor shown in Figures 6 and 7 will be identical and the reference characters to like parts of the modified form of invention will bear the same reference characters with the prime notation added. The friction pulley mechanism is identical to that already described, except that the friction pulley 79' (Figures 6 and 7) is of smaller diameter than the friction pulley 79 shown in Figures 1, 3, 4 and 5. This is due to the fact that, instead of the friction pulley 79' being driven from the interior of the rim 80 of the tractor wheel, it is driven by a mechanism simulating a brake drum and indicated by reference character 100. This annular member 100 is in the form of a brake drum and has suitable lugs 101 thereon which are adapted to fit against the brake drum 102 of the tractor wheel, is being slipped over the brake drum 102 after the tractor wheel is removed. The drum 100 is held in place on the tractor brake drum 102 by bolts 104 penetrating the lugs 101 (Figures 6 and 7).

The tractor wheel 12 instead of being attached to the axle of the tractor in the manner shown in Figure 4, for example, is attached by reversing the position of the wheel to place the wheels 12 further apart and the body portion of each wheel 12 projects outwardly as in Figure 4 and is connected in the same manner by suitable bolts 103 to the driving mechanism attached to the axle of the tractor. The latter driving mechanism is not shown but is conventional.

It is noted that the friction wheel 79' is of less diameter than the friction wheel 79 due to the fact that the perimeter of the rim 100 is substantially less than the diameter of the tractor wheel rim 80.

Figure 3:
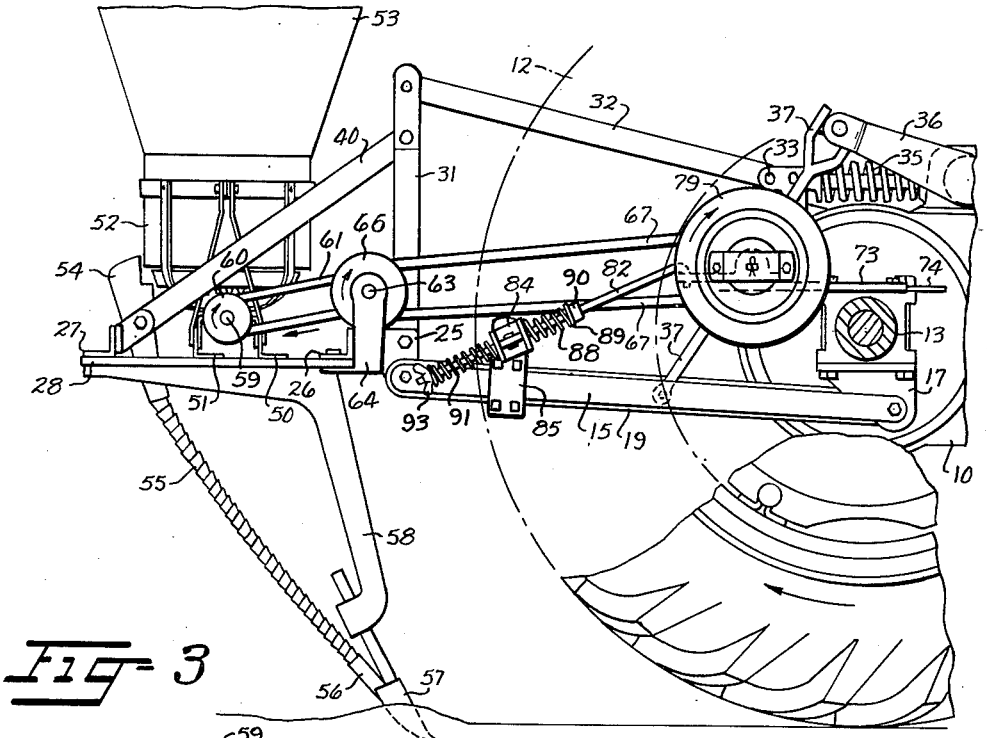
Figure 3 is an elevation similar to Figure 1 but showing the planting or distributing mechanism in operative position.

In Figure 3 the parts are shown in operative position and when it is desired to move the parts from the position shown in Figure 3 to the position shown in Figure 1, the hydraulic mechanism is operated which lifts the parts to the position shown in Figure 1. During this movement, the cuff 84 tends to move closer to the sliding plate 73 thus pushing the sliding plate 73 forwardly which will release the friction wheel in both forms of the invention from contact with its driving surface which it normally engages when the lift mechanism is in lowered position.

It is thus seen I have provided a driving mechanism for planters and distributors which can easily and quickly be attached to a conventional tractor with its conventional planter and distributor supporting framework thereon and which does not entail the connecting of the planters and distributors to the power take-off or other fixed driving mechanisms of the tractor.

Throughout the specification and claims the words "planter" and "distributor" have been employed interchangeably, and where one is employed it is intended to mean either one or both of the mechanisms.

In the drawings and specification there has been set forth a preferred embodiment of the invention and although specific terms are employed, they are used in a generic and descriptive sense only, and not for purposes of limitation, the scope of the invention being defined in the claims.

I claim:

1. In a tractor having a rear axle housing, rear ground wheels on opposite ends of said axle housing, at least one of said ground wheels having an exposed inner peripheral surface thereon, a lift means including a plurality of upper and lower lift links pivotally connected to respective upper and lower portions of the housing and extending rearwardly therefrom and means on the rear ends of said lift links for supporting an implement; the combination therewith of a substantially horizontal plate member guided for forward and rearward movement on said axle housing above the level of the forward ends of the lower links, a shaft journaled on said plate member and extending substantially parallel to the axis of said ground wheels, a friction wheel fixed on said shaft and spaced forwardly of the rear portion of said peripheral surface when the lift means is in raised position, a drive wheel fixed on said shaft remote from the friction wheel, a drive actuating link having its forward end pivotally connected to the rear portion of said plate member, and means pivotally connecting the rear portion of said actuating link to a medial portion of one of said lower lift links whereby downward movement of said lift means will pull the rear end of the actuating link downwardly and rearwardly to move the plate member, shaft, friction wheel and drive wheel rearwardly thereby moving the friction wheel against the peripheral surface, and upward movement of the lift means will move the friction wheel out of engagement with said peripheral surface.

2. In a structure according to claim 1, means to guide said plate member on said axle housing comprising a substantially horizontal base plate fixed on said axle housing and having at least one forwardly and rearwardly extending slot therein, said plate member being movable upon said base plate, a headed shoulder screw having an enlarged portion loosely penetrating said slot, and said screw having a reduced upper end threadably secured in said first-named plate member.

3. In a tractor having a rear axle housing, rear ground wheels on opposite ends of said axle housing, at least one of said ground wheels having an exposed inner peripheral surface thereon, a lift means including a plurality of upper and lower lift links pivotally connected to respective upper and lower portions of the housing and extending rearwardly therefrom and means on the rear ends of said links for supporting an implement having a rotary wheel thereon whose axis extends substantially parallel to the axis of said ground wheels; the combination therewith of a member guided for forward and rearward movement on said axle housing above the level of the forward ends of the lower links, a shaft journaled on said member and extending substantially parallel to the axis of said ground wheels, a friction wheel fixed on said shaft and spaced forwardly of the rear portion of said peripheral surface when the lift means is in raised position, a drive wheel fixed on said shaft, an endless pliable element connecting said rotary wheel and said drive wheel, a drive actuating link having its forward end pivotally connected to said member, and means pivotally connecting the rear portion of said actuating link to a rear portion of one of said lower lift links whereby downward movement of said lift means will pull the rear end of the actuating link downwardly and rearwardly to move the member, shaft, friction wheel and drive wheel rearwardly thereby moving the friction wheel against the peripheral surface, and upward movement of the lift means will move the friction wheel out of engagement with said peripheral surface.

4. A structure according to claim 3 wherein said means connecting the actuating link to said one of the lower lift links comprises a cuff member oscillatably mounted on said last-named lift link for movement about an axis substantially parallel to the axis of said shaft and being loosely penetrated by said actuating link, first and second compression springs encircling said actuating link and whose proximal ends engage opposite sides of said cuff member, and first and second abutments fixed on said actuating link and engaging the distal ends of the respective first and second springs.

References Cited in the file of this patent

UNITED STATES PATENTS

| | | |
|---|---|---|
| 352,186 | Henderson | Nov. 9, 1886 |
| 470,363 | Packer | Mar. 8, 1892 |
| 1,918,172 | Barron et al. | July 11, 1933 |
| 2,095,876 | Johnston | Oct. 12, 1937 |
| 2,195,831 | Thompson et al. | Apr. 2, 1940 |
| 2,339,689 | Englund | Jan. 18, 1944 |
| 2,559,183 | Barnett | July 3, 1951 |